US012675509B2

(12) United States Patent
Bagdemir

(10) Patent No.: US 12,675,509 B2
(45) Date of Patent: Jul. 7, 2026

(54) B-TREE BASED STORAGE ENGINE FOR STORING HIERARCHICAL STRUCTURES

(71) Applicant: Adobe Inc., San Jose, CA (US)

(72) Inventor: Erhan Bagdemir, Tornesch (DE)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/956,149

(22) Filed: Nov. 22, 2024

(65) Prior Publication Data

US 2026/0147790 A1 May 28, 2026

(51) Int. Cl.
*G06F 16/31* (2019.01)
(52) U.S. Cl.
CPC .......... *G06F 16/322* (2019.01); *G06F 16/328* (2019.01)
(58) Field of Classification Search
CPC ............................ G06F 16/322; G06F 16/328
See application file for complete search history.

(56) References Cited

U.S. PATENT DOCUMENTS

| | | | | |
|---|---|---|---|---|
| 5,752,243 A | * | 5/1998 | Reiter ................. | G06F 16/2246 |
| 11,061,903 B1 | * | 7/2021 | Goel ..................... | G06F 3/0607 |
| 2001/0042240 A1 | * | 11/2001 | Ng .......................... | G06F 8/427 |
| | | | | 717/122 |
| 2014/0279909 A1 | * | 9/2014 | Sudarsanam ......... | G06F 16/128 |
| | | | | 707/639 |

* cited by examiner

*Primary Examiner* — Amanda L Willis
(74) *Attorney, Agent, or Firm* — Polsinelli LLP

(57) ABSTRACT
Disclosed embodiments may provide techniques for performing database operations using a hierarchy-enhanced B-tree index. A computer-implemented method can include executing a query to access a data item by traversing a root node of a hierarchy-enhanced B-tree index to a particular leaf node connected to the root node. In some instances, the particular leaf node indicates a first unstructured-data record. The method can also include determining that the particular leaf node includes a sequential data structure. The sequential data structure identifies a hierarchical relationship between the first unstructured-data record and other unstructured-data records indicated by one or more other leaf nodes. The method can also include using the sequential data structure to access the one or more other leaf nodes without additional path traversals of the hierarchy-enhanced B-tree index. The method can also include retrieving the data item by parsing the other unstructured-data records.

20 Claims, 6 Drawing Sheets

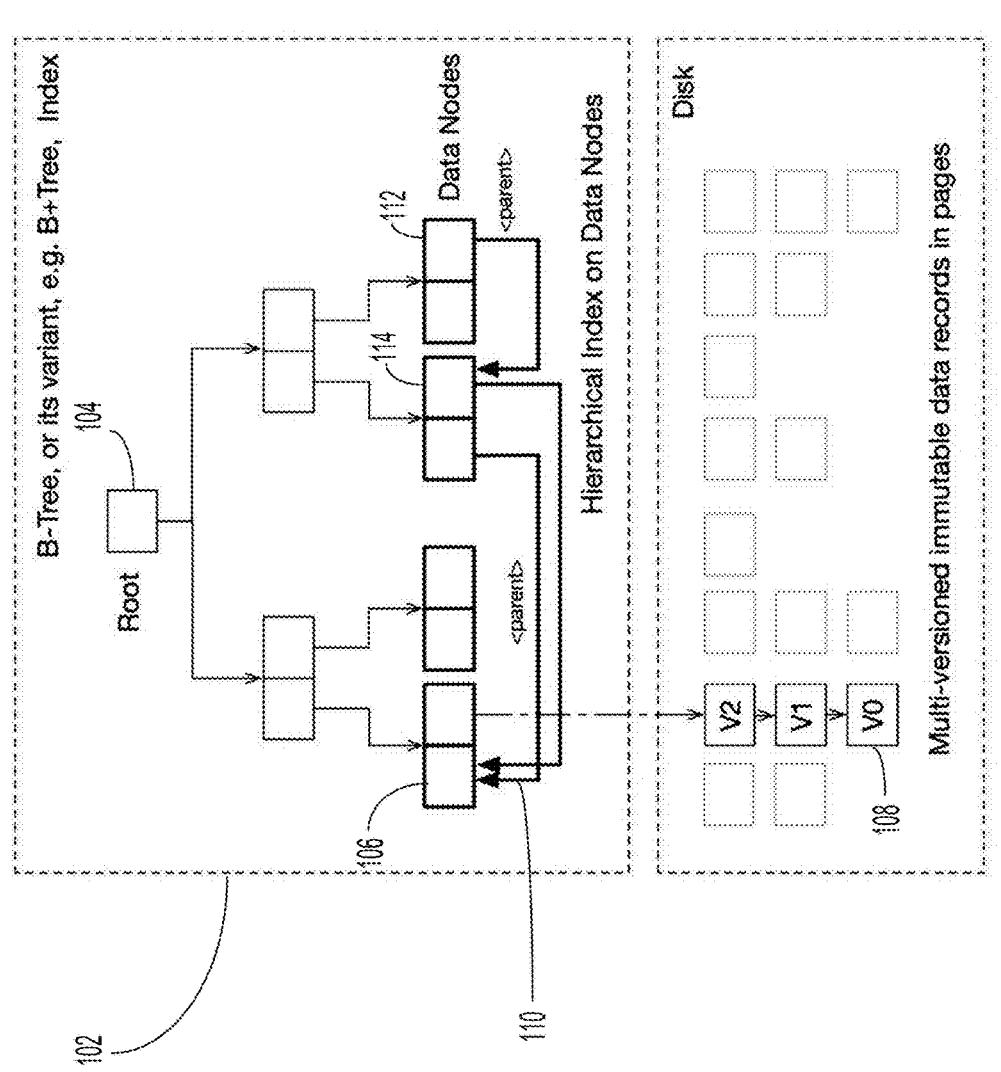
*FIG. 1*

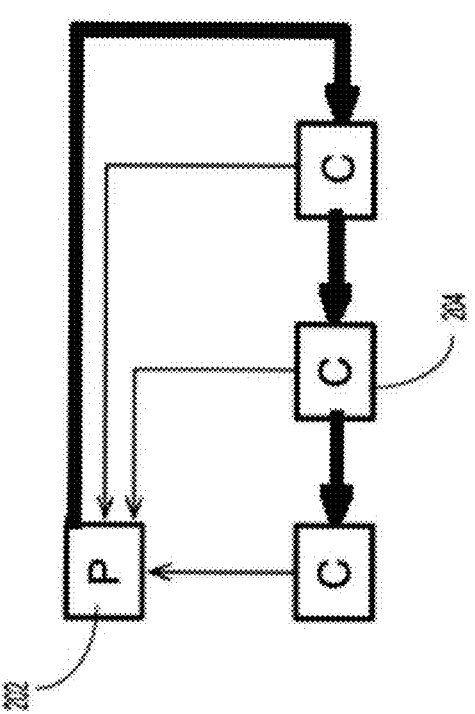
FIG. 2

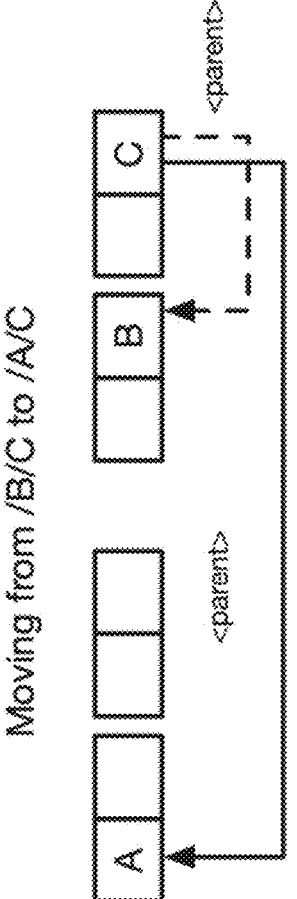
*FIG. 3*

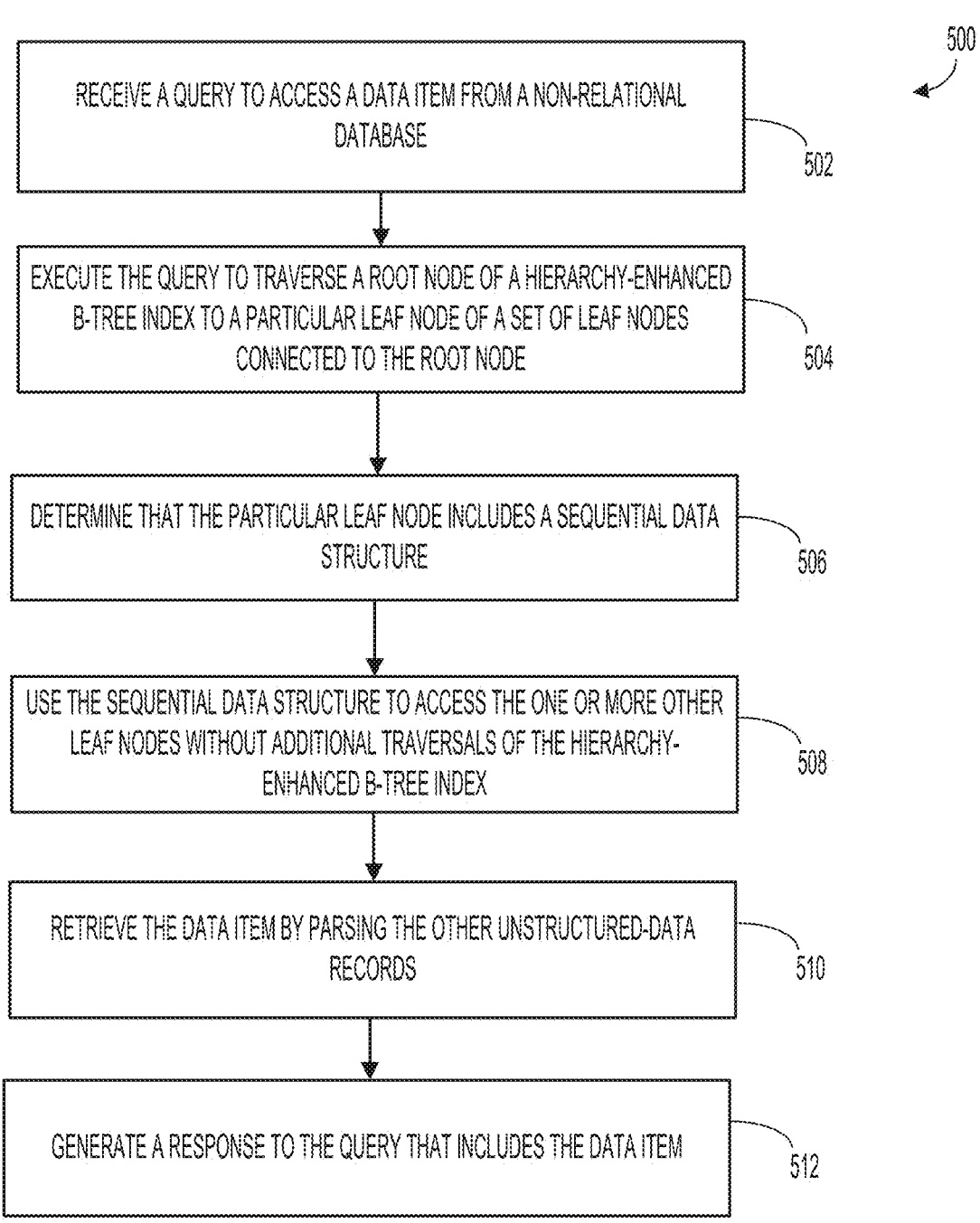

500

RECEIVE A QUERY TO ACCESS A DATA ITEM FROM A NON-RELATIONAL DATABASE ⟶ 502

EXECUTE THE QUERY TO TRAVERSE A ROOT NODE OF A HIERARCHY-ENHANCED B-TREE INDEX TO A PARTICULAR LEAF NODE OF A SET OF LEAF NODES CONNECTED TO THE ROOT NODE ⟶ 504

DETERMINE THAT THE PARTICULAR LEAF NODE INCLUDES A SEQUENTIAL DATA STRUCTURE ⟶ 506

USE THE SEQUENTIAL DATA STRUCTURE TO ACCESS THE ONE OR MORE OTHER LEAF NODES WITHOUT ADDITIONAL TRAVERSALS OF THE HIERARCHY-ENHANCED B-TREE INDEX ⟶ 508

RETRIEVE THE DATA ITEM BY PARSING THE OTHER UNSTRUCTURED-DATA RECORDS ⟶ 510

GENERATE A RESPONSE TO THE QUERY THAT INCLUDES THE DATA ITEM ⟶ 512

*FIG. 5*

B-TREE BASED STORAGE ENGINE FOR STORING HIERARCHICAL STRUCTURES

FIELD

The present disclosure relates generally to performing database operations. In one example, the systems and methods described herein may be used to performing database operations using a hierarchy-enhanced B-tree index.

BACKGROUND

Non-relational databases are configured to store and manage large amounts of data. Unlike relational databases, which organize data into structured tables with rows and columns, non-relational databases are more flexible in their data storage approach, allowing for the use of various data models such as document, key-value, graph, and column-family. This flexibility makes them well-suited for handling unstructured or semi-structured data (e.g., JSON, XML), as well as large-scale, distributed datasets. Non-relational databases are often optimized for specific types of data and can scale horizontally, in a way that data can be distributed across multiple servers to handle high traffic loads efficiently. The non-relational databases are thus commonly used in applications requiring fast, scalable data access, such as real-time web applications, content management systems, or big data processing. Non-relational databases often sacrifice strict consistency for availability and partition tolerance, making them ideal for applications where speed and flexibility are more important than transactional accuracy.

A B-tree index is a data structure configured to optimize the retrieval of data stored in non-relational databases. The B-tree index organizes keys in a hierarchical, balanced structure where each node can contain multiple keys, and data is stored in leaf nodes. The B-tree structure ensures that searching for any key is efficient—with a time complexity of O(log n)—even as the dataset grows large. By minimizing disk I/O operations and providing fast lookups, the B-tree index is useful in enhancing the scalability and performance of non-relational databases.

SUMMARY

Disclosed embodiments may provide a B-tree based storage engine for storing hierarchical structures. The hierarchy-enhanced B-tree index is configured to explicitly store hierarchical relationships directly within the B-tree index itself. A computer-implemented method includes accessing one or more data items having a hierarchical relationship, in which the hierarchical relationship is indicated by a sequential data structure (e.g., a linked list) associated with leaf nodes of the B-tree index. As an illustrative example, the linked list of the hierarchy-enhanced B-tree index identifies a first leaf node associated with a child data record that points to a second leaf node associated with a parent data record. Various database operations involving the data items having the hierarchical relationship can be efficiently performed by using the sequential data structure and without additional path traversals of the B-tree index.

In an embodiment, a system comprises one or more processors and memory including instructions that, as a result of being executed by the one or more processors, cause the system to perform the processes described herein. In another embodiment, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Illustrative embodiments are described in detail below with reference to the following figures.

FIG. 1 illustrates an example schematic diagram of a hierarchy-enhanced B-tree index, according to some embodiments.

FIG. 2 shows an example sequential data structure that identifies the hierarchical relationship between nodes of a hierarchy-enhanced B-tree, according to some embodiments.

FIG. 3 shows an example schematic diagram for updating hierarchical relationships in the hierarchy-enhanced B-tree index, according to some embodiments.

FIG. 5 shows an illustrative example of a process for performing database operations using a hierarchy-enhanced B-tree index, in accordance with some embodiments

Figure 4:
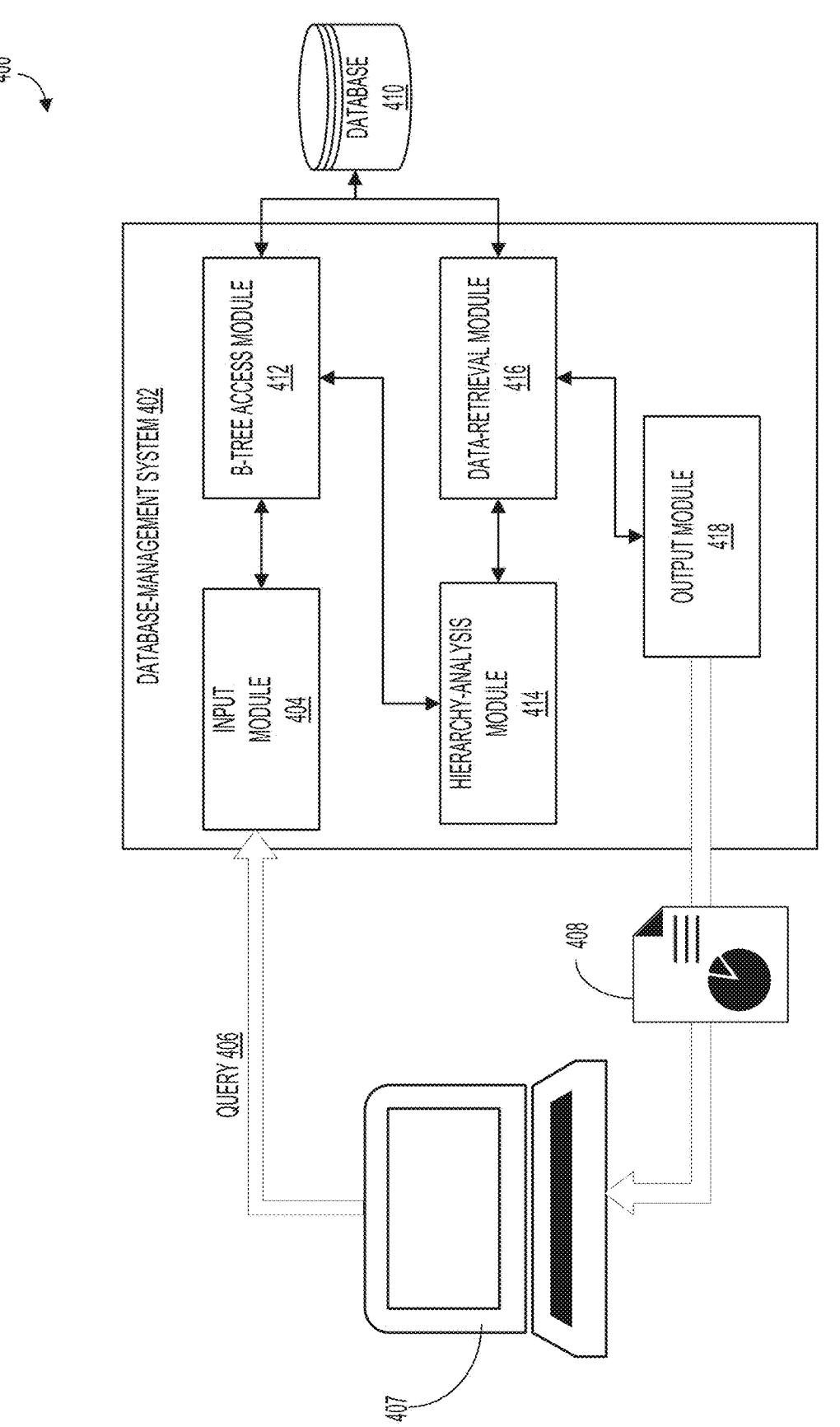
FIG. 4 shows a schematic diagram of a computing environment for performing database operations using a hierarchy-enhanced B-tree index, according to some embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Existing techniques of using B-trees include traversing from a root node of the B-tree to a leaf node, in which the leaf node includes a pointer to a corresponding data record stored on a disk. However, the existing B-trees are limited when it comes to recognizing and managing hierarchical or sibling relationships between the data records. Such limitation often requires multiple tree traversals to find related data records, which can lead to inefficiencies, especially as the number of data records and the size of the B-tree grow. Moreover, the existing techniques rely on parsing the actual data records to deduce the hierarchical relationships, which necessitates repeated and costly disk access operations that degrade overall system performance.

To address the aforementioned deficiencies, the present techniques are directed to performing non-relational database operations using a B-tree index that reflect hierarchical relationships between leaf nodes, such as parent-child or sibling relationships. A database-management system receives a query to access a data item from a non-relational database. As an illustrative example, the database-management system receives a query to retrieve an edited version of the particular image. In some instances, the non-relational database stores a plurality of unstructured-data records across one or more storage systems.

The database-management system executes the query to traverse a root node of a hierarchy-enhanced B-tree index to a particular leaf node of a set of leaf nodes connected to the root node. The particular leaf node indicates a first unstructured-data record. Continuing with the example, the database-management system accesses the hierarchy-enhanced B-tree index to identify the particular leaf node to identify a JSON file that identifies a network address that stores an original version of the particular image.

The database-management system determines that the particular leaf node includes a sequential data structure. The sequential data structure identifies a hierarchical relationship between the first unstructured-data record and other unstructured-data records indicated by one or more other leaf nodes. Continuing with the example, the database-management system determines that the particular leaf node includes a linked list indicating a parent-child relationship between the original version and the edited version of the particular image.

The database-management system uses the sequential data structure to access the one or more other leaf nodes without additional path traversals of the hierarchy-enhanced B-tree index. Then, the database-management system retrieves the data item by parsing the other unstructured-data records. Continuing with the example, the database-management system parses the linked list to access the leaf node of the hierarchy-enhanced B-tree index that stores the edited version of the particular image. The use of the linked list allows the database-management system to efficiently identify a location of the edited version of the particular image without repeatedly traversing the B-tree index (e.g., from the root node to other leaf nodes).

The database-management system generates a response to the query that includes the data item. Continuing with the example, the database-management system transmits the edited version of the particular image to the user device.

The present techniques thus provide a significant improvement over existing database-management systems by combining the scalability of non-relational databases (e.g., a document DB) with the advantages of a graph database to resolve hierarchical paths or move subtrees within the B-tree index. The present techniques thus allow related data records to be accessed more efficiently, without the need to repeatedly parse and traverse the B-tree index. The present techniques also reduce the need to parsing the data records to identify the hierarchical relationships. In some implementations, the hierarchy-enhanced B-tree index is configured to support different database operations, such as storing new versions of data records as separate leaf nodes that are linked by the hierarchical data structure, which can facilitate retrieval of the versioned data records without additional tree traversals and/or disk access.

I. Techniques for Performing Database Operations Using a Hierarchy-Enhanced B-Tree Index

A. Example Implementation

FIG. 1 illustrates an example schematic diagram 100 of a hierarchy-enhanced B-tree index, according to some embodiments. As shown in FIG. 1, a hierarchy-enhanced B-tree 102 is a self-balancing tree data structure configured to store and retrieve data stored in non-relational databases. The hierarchy-enhanced B-tree 102 includes one or more nodes, in which each node includes a set of keys that are either configured as a pointer to one of the corresponding child nodes or a pointer to a location (e.g., disk) that stores the data item. For example, the hierarchy-enhanced B-tree index includes a root node 104 connected to one or more child leaf nodes 106, in which each child leaf node connected from the root node may point to a corresponding data item 108.

The data items having a hierarchical relationship 110 can be indicated by a sequential data structure (e.g., a linked list). For example, the linked list of the hierarchy-enhanced B-tree index identifies a first leaf node 112 associated with a child data record that points to a second leaf node 114 associated with a parent data record. FIG. 2 shows an example sequential data structure that identifies the hierarchical relationship between nodes of a hierarchy-enhanced B-tree index, according to some embodiments. For example, the sequential data structure 200 identifies a parent "P" node sequentially connected to three "C" nodes, which can indicate a parent-child relationship between the leaf nodes stored in the hierarchy-enhanced B-tree index. In addition, the sequential data structure 200 additionally includes a pointer from each "C" node to the "P" node. Such structure increases efficiency the database operations, as data records stored in the "P" node 202 can be quickly accessed through a single pointer from a "C" node 204, rather than traversing through the entire linked list.

Various database operations involving the data items having the hierarchical relationship can be efficiently performed by using the sequential data structure and without additional path traversals of the B-tree index. FIG. 3 shows an example schematic diagram 300 for updating hierarchical relationships in the hierarchy-enhanced B-tree index, according to some embodiments. In FIG. 3, the database-management system updates the hierarchical relationship by removing the parent-child relationship between the leaf nodes "C" and "B". Then, the database-management system updates the sequential data structure to indicate a new parent-child hierarchical relationship between the leaf nodes "C" and "A". Other types of database operations can include a copy operation, a list-children operation, and copy operation.

B. Computing Environment

FIG. 4 shows a schematic diagram of a computing environment 400 for performing database operations using a hierarchy-enhanced B-tree index, according to some embodiments. In FIG. 4, an input module 404 of a database-management system 402 receives a query 406 from a user device 407 to access a data item 408 from a non-relational database 410. The data item 408 can be an individual element of data such as a number, character, string of characters, or Boolean values. In some instances, the data item 408 corresponds to a data object or file including an image, a video, a document (e.g., software code, web document), biometric data, machine-learning models, and other types of data known to a person skilled in the art.

The non-relational database 410 is configured to store and manage data without conforming to the predefined schema of relational databases. For example, rather than organizing data into tables with rows and columns, the non-relational database 410 stores information in various flexible formats, such as key-value pairs, documents, wide-column stores, or graph structures. The non-relational database 410 implements consistency and distributed consensus algorithms to manage replication and failover in a cluster of nodes.

In some instances, the non-relational database 410 stores a plurality of unstructured-data records across one or more storage systems. For example, the non-relational database 410 stores and manages unstructured or semi-structured data records, such as JSON, XML, or binary data. A unstructured-data record is associated with schema-less data format that is configured to store complex, heterogeneous data items 408 without predefined relationships or data types. Unlike structured records in relational databases, which organize data items 408 into a fixed schema with defined fields (columns) and data types, the unstructured-data record stores data items 408 as key-value pairs, in which the keys are strings and the values can be strings, numbers, Booleans, arrays, or nested objects containing further key-value pairs. The unstructured-data record stores hierarchical and nested information in a manner that can represent complex data structures such as lists, dictionaries, or embedded objects.

In some instances, one or more unstructured-data records stored in the non-relational database 410 vary in formats and the fields they contain, in which the fields can be added or omitted dynamically without requiring schema updates. In non-relational databases 410, the unstructured-data records are often indexed by primary keys or metadata to enable efficient search and retrieval operations, despite the lack of strict structural constraints. Examples of the unstructured-data record include JSON, XML, YAML, BSON, Avro, and plain text files such as logs, emails, or HTML documents.

The user device 407 corresponds to any type of electronic device configured to transmit query and receive responses to queries from other devices (e.g., the database-management system 402). The user devices can include a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

The query 406 includes a request to retrieve, update, or manipulate data item 408 stored in the non-relational database 410. The structure and syntax of the query 406 depend on the specific type of the non-relational database 410, which may use a variety of query 406 languages, APIs, or command interfaces. For example, in document-based NoSQL database, the query 406 can be formatted in a JSON syntax, in which the query 406 specifies a filter to identify data items 408 based on field values. In some instances, the query 406 identifies one or more key-value pairs, using search operators such as $gt (greater than) or $in (to match multiple values). The query 406 additionally allows for complex nested conditions to be applied. In graph-based non-relational databases 410, the query 406 is used to traverse and explore relationships between nodes, edges, and properties within the graph. In some instances, the query 406 is configured to perform aggregation operations, indexing strategies, and filtering mechanisms that are optimized for the non-relational database's particular data model, and may utilize features including eventual consistency, sharding, and replication.

A B-tree access module 412 of the database-management system 402 executes the query 406 to traverse a root node of a hierarchy-enhanced B-tree index to a particular leaf node of a set of leaf nodes connected to the root node. The hierarchy-enhanced B-tree index is a self-balancing tree data structure configured to store and retrieve data in sorted order. In some instances, the hierarchy-enhanced B-tree includes one or more nodes, in which each node includes a set of keys that are either configured as a pointer to one of the corresponding child nodes or a pointer to a location (e.g., disk) that stores the data item 408. For example, the hierarchy-enhanced B-tree index includes a root node connected to one or more child leaf nodes, in which each child leaf node connected from the root node may point to a corresponding data item (e.g., a first unstructured-data record).

As new data is inserted or deleted, the hierarchy-enhanced B-tree index is configured to adjust itself to keep the tree balanced (i.e., rendering all leaf nodes remaining at the same depth within the B-tree). The balancing operation ensures that non-relational database operations only require approximately the same number of steps, regardless of the dataset size. As a result, the hierarchy-enhanced B-tree indexes in non-relational databases 410 allow for fast lookups, range queries, and ordered traversals of data, significantly improving query 406 performance, especially when dealing with large datasets stored on disk or other slower storage media. Variants like B+ trees, where all the data records are stored in leaf nodes, can be used in these systems to ensure efficient data retrieval and indexing.

A hierarchy-analysis module 414 of the database-management system 402 determines that the particular leaf node includes a sequential data structure. Examples of the sequential data structure include arrays, queues, and linked lists. In the sequential data structure, each data-structure element includes a direct predecessor and successor (except for the first and last data elements). For example, in a linked list, each data element includes the first unstructured-data record and a pointer to another unstructured-data record of the one or more other leaf nodes.

The sequential data structure identifies a hierarchical relationship between the first unstructured-data record and other unstructured-data records indicated by one or more other leaf nodes. For example, a first data element of the sequential data structure is defined as a "parent" data record, a second data element connected to the first data element is defined as a "child" data record, a third data element connected to the second data element is defined as a "grandchild" data element. Such configuration creates the hierarchical relationship between unstructured-data records stored by the hierarchy-enhanced B-tree index.

A hierarchy-analysis module 414 of the database-management system 402 uses the sequential data structure to access the one or more other leaf nodes without additional path traversals of the hierarchy-enhanced B-tree index. The hierarchical relationship between unstructured-data records is advantageous when the related unstructured-data records are dispersed through the hierarchy-enhanced B-tree index. For example, the particular leaf node is associated with a particular traversal path that is different from traversal paths of the one or more other leaf nodes. Despite such configuration, the sequential data structure is used to access the corresponding data records without additionally traversing from the root node and through the different paths of the hierarchy-enhanced B-tree index. In another example, the particular leaf node and the one or more other leaf nodes are within the same depth of the hierarchy-enhanced B-tree index. Even so, the sequential data structure is used to access the corresponding data records without additionally traversing from the root node and through the different paths of the hierarchy-enhanced B-tree index.

A data-retrieval module 416 of the database-management system 402 retrieves the data item 408 by parsing the other unstructured-data records. For example, the database-management system 402 can parse one of the other unstructured-data records by parsing the data record and access the data item 408 using a key value (e.g., if the data item 408 is associated with a key-value pair) or an index value (e.g., if the data item 408 is one of the values within an array) specified by the query 406.

An output module 418 of the database-management system 402 generates a response to the query 406 that includes the data item 408. The response can additionally include other types of data associated with the hierarchical relationship. For example, the response additionally includes another data item 408 retrieved from the first unstructured-data record. In another example, the response additionally includes the response additionally includes a data path between the first unstructured-data record and the unstructured-data record from which the data item 408 was retrieved. In yet another example, the response additionally includes a list of the other unstructured-data records are hierarchically related (e.g., a child relationship) to the first unstructured data-record. The response can be outputted, such as displaying the response on a graphical-user interface of a device that transmitted the query 406 or transmitting the response to another device through a communication network.

Various types of database operations can be performed using the sequential data structure within the B-tree index. For example, a first type of database operation includes creating a new version of a given unstructured-data record. If the first unstructured-data record is associated with an initial version, the database-management system 402 receives a request to create an updated version of the first unstructured-data record. The database-management system 402 generates a new leaf node that indicates the updated version of the first unstructured-data record. The database-management system 402 connects the new leaf node to the root node. The database-management system 402 updates the sequential data structure to incorporate the new leaf node.

A second type of database operation includes deleting a particular unstructured-data record or removing the particular unstructured-data record from the hierarchical relationship. The database-management system 402 receives a request to remove a second unstructured-data record of the other unstructured-data records. The database-management system 402 updates the sequential data structure to indicate a modified hierarchical relationship that excludes the second unstructured-data record.

A third type of database operation includes updating the hierarchical relationship between the unstructured-data records. The database-management system 402 receives a request to move a second unstructured-data record of the other unstructured-data records to be listed under a third unstructured-data record indicated by another leaf node. The database-management system 402 updates the sequential data structure to indicate a modified hierarchical relationship that excludes the second unstructured-data record. The database-management system 402 generates a second sequential data structure to indicate a second hierarchical relationship that associates the second unstructured-data record and the third unstructured-data record.

C. Methods

FIG. 5 shows an illustrative example of a process 500 for performing database operations using a hierarchy-enhanced B-tree index, in accordance with some embodiments. For illustrative purposes, the process 500 is described with reference to the components illustrated in FIG. 4, though other implementations are possible. For example, the program code for the database-management system 402 of FIG. 4, is executed by one or more processing devices to cause a server system (e.g., the computing device 602 of FIG. 6) to perform one or more operations described herein.

At step 502, the database-management system receives a query to access a data item from a non-relational database. The data item can be an individual element of data such as a number, character, string of characters, or Boolean values. In some instances, the data item corresponds to a data object or file including an image, a video, a document (e.g., software code, web document), biometric data, machine-learning models, and other types of data known to a person skilled in the art. The non-relational database is configured to store and manage data without conforming to the pre-defined schema of relational databases In some instances, the non-relational database stores a plurality of unstructured-data records across one or more storage systems. For example, the non-relational database stores and manages unstructured or semi-structured data records, such as JSON, XML, or binary data. A unstructured-data record is associated with schema-less data format that is configured to store complex, heterogeneous data items without predefined relationships or data types. The query includes a request to retrieve, update, or manipulate data item stored in the non-relational database. The structure and syntax of the query depend on the specific type of the non-relational database, which may use a variety of query languages, APIs, or command interfaces. For example, in document-based NoSQL database, the query can be formatted in a JSON syntax, in which the query specifies a filter to identify data items based on field values.

At step 504, the database-management system executes the query to traverse a root node of a hierarchy-enhanced B-tree index to a particular leaf node of a set of leaf nodes connected to the root node. The hierarchy-enhanced B-tree index corresponds to a self-balancing tree data structure configured to store and retrieve data in sorted order. For example, the hierarchy-enhanced B-tree index includes a root node connected to one or more child leaf nodes, in which each child leaf node connected from the root node may store a corresponding data item (e.g., a first unstructured-data record) and/or indicate a subsequent set of child leaf nodes. In some instances, hierarchy-enhanced B-tree index is a B+ tree.

At step 506, the database-management system determines that the particular leaf node includes a sequential data structure. Examples of the sequential data structure include arrays, queues, and linked lists. In the sequential data structure, each data-structure element includes a direct predecessor and successor (except for the first and last data elements). For example, in a linked list, each data element includes the first unstructured-data record and a pointer to another unstructured-data record of the one or more other leaf nodes.

The sequential data structure identifies a hierarchical relationship between the first unstructured-data record and other unstructured-data records indicated by one or more other leaf nodes. For example, a first data element of the sequential data structure is defined as a "parent" data record, a second data element connected to the first data element is defined as a "child" data record, a third data element connected to the second data element is defined as a "grand-child" data element. Such configuration creates the hierarchical relationship between unstructured-data records stored by the hierarchy-enhanced B-tree index.

At step 508, the database-management system uses the sequential data structure to access the one or more other leaf nodes without additional path traversals of the hierarchy-enhanced B-tree index. The hierarchical relationship between unstructured-data records is advantageous when the related unstructured-data records are dispersed through the hierarchy-enhanced B-tree index. For example, the particular leaf node is associated with a particular traversal path that is different from traversal paths of the one or more other leaf nodes. Despite such configuration, the sequential data structure is used to access the corresponding data records without additionally traversing from the root node and through the different paths of the hierarchy-enhanced B-tree index.

At step 510, the database-management system retrieves the data item by parsing the other unstructured-data records. For example, the database-management system can parse one of the other unstructured-data records by parsing the data record and access the data item using a key value (e.g., if the data item is associated with a key-value pair) or an index value (e.g., if the data item is one of the values within an array) specified by the query.

At step 512, the database-management system generates a response to the query that includes the data item. The response can additionally include other types of data associated with the hierarchical relationship. For example, the response additionally includes another data item retrieved from the first unstructured-data record. In another example, the response additionally includes the response additionally includes a data path between the first unstructured-data record and the unstructured-data record from which the data item was retrieved. In yet another example, the response additionally includes a list of the other unstructured-data records are hierarchically related (e.g., a child relationship) to the first unstructured data-record. The response can be outputted, such as displaying the response on a graphical-user interface of a device that transmitted the query or transmitting the response to another device through a communication network.

Various types of database operations can be performed using the sequential data structure within the B-tree index. For example, a first type of database operation includes creating a new version of a given unstructured-data record. If the first unstructured-data record is associated with an initial version, the database-management system receives a request to create an updated version of the first unstructured-data record. The database-management system generates a new leaf node that indicates the updated version of the first unstructured-data record. The database-management system connects the new leaf node to the root node. The database-management system updates the sequential data structure to incorporate the new leaf node.

A second type of database operation includes deleting a particular unstructured-data record or removing the particular unstructured-data record from the hierarchical relationship. The database-management system receives a request to remove a second unstructured-data record of the other unstructured-data records. The database-management system updates the sequential data structure to indicate a modified hierarchical relationship that excludes the second unstructured-data record.

A third type of database operation includes updating the hierarchical relationship between the unstructured-data records. The database-management system receives a request to move a second unstructured-data record of the other unstructured-data records to be listed under a third unstructured-data record indicated by another leaf node. The database-management system updates the sequential data structure to indicate a modified hierarchical relationship that excludes the second unstructured-data record. The database-management system generates a second sequential data structure to indicate a second hierarchical relationship that associates the second unstructured-data record and the third unstructured-data record. Process 500 terminates thereafter.

II. Example Systems

Figure 6:
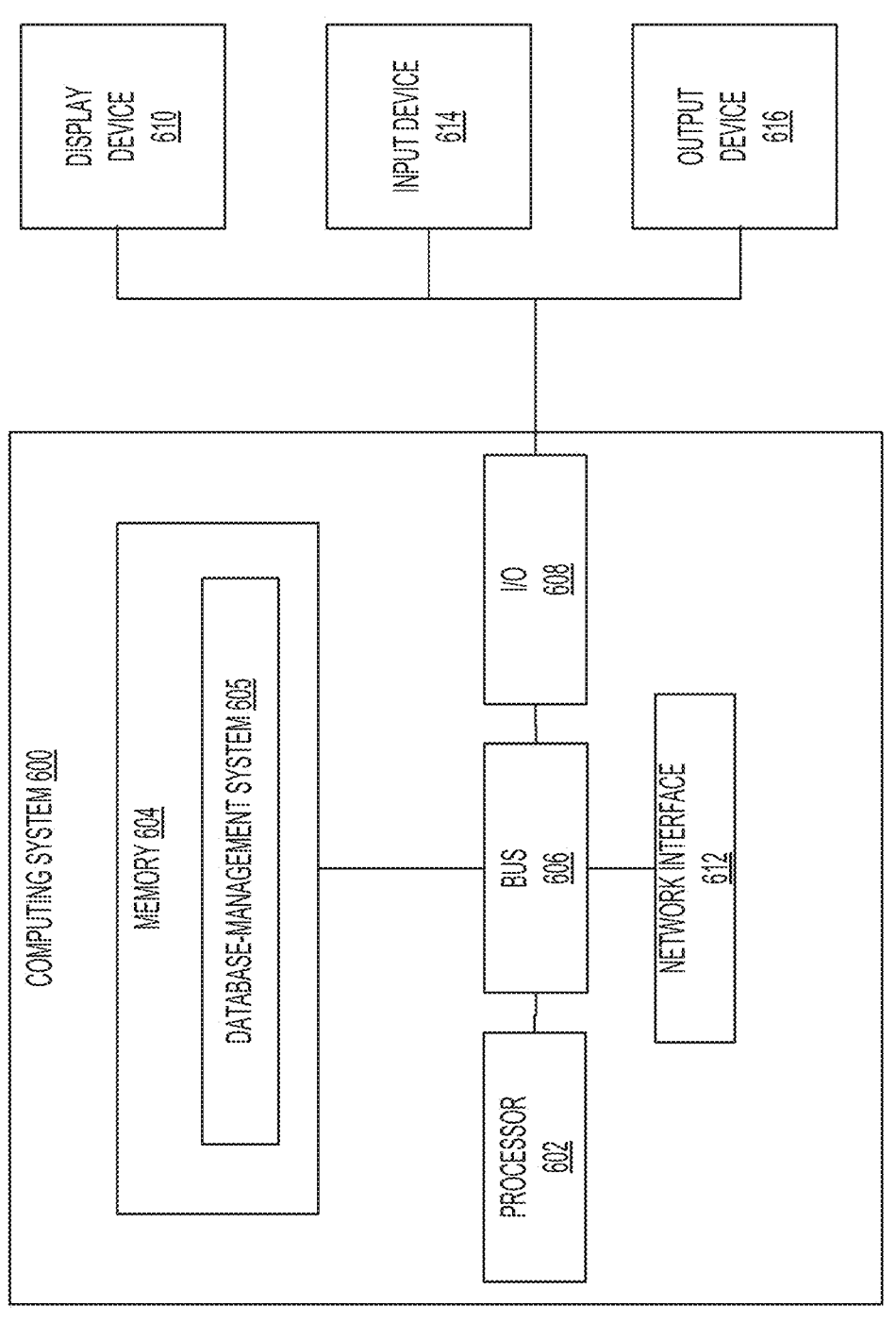
FIG. 6 shows a computing system architecture including various components in electrical communication with each other using a connection in accordance with various embodiments.

Any suitable computing system or group of computing systems can be used for performing the operations described herein. For example, FIG. 6 depicts a computing system 600 that can implement any of the computing systems or environments discussed above. In some embodiments, the computing system 600 includes a processing device 602 that executes the database-management system 605, a memory that stores various data computed or used by the database-management system 605, an input device 614 (e.g., a mouse, a stylus, a touchpad, a touch-screen, etc.), and an output device 616 that presents output to a user (e.g., a display device that displays graphical content generated by database-management system 605). For illustrative purposes, FIG. 6 depicts a single computing system on which the database-management system 605 is executed, and the input device 614 and output device 616 are present. But these applications, datasets, and devices can be stored or included across different computing systems having devices similar to the devices depicted in FIG. 6.

The example of FIG. 6 includes a processing device 602 communicatively coupled to one or more memory devices 604. The processing device 602 executes computer-executable program code stored in a memory device 604, accesses information stored in the memory device 604, or both. Examples of the processing device 602 include a microprocessor, an application-specific integrated circuit ("ASIC"), a field-programmable gate array ("FPGA"), or any other suitable processing device. The processing device 602 can include any number of processing devices, including a single processing device.

The memory device 604 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions could include processor-specific instructions generated by a compiler or an interpreter from code written in any suitable computer-programming language, including, for example, C, C++, C#, Visual Basic, Java, Python, Perl, JavaScript, and ActionScript.

The computing system 600 could also include a number of external or internal devices, such as a display device 610, or other input or output devices. For example, the computing system 600 is shown with one or more input/output ("I/O") interfaces 608. An I/O interface 608 can receive input from input devices or provide output to output devices. One or more buses 606 are also included in the computing system 600. Each bus 606 communicatively couples one or more components of the computing system 600 to each other or to an external component.

The computing system 600 executes program code that configures the processing device 602 to perform one or more of the operations described herein. The program code includes, for example, code implementing the document-processing application 102 or other suitable applications that perform one or more operations described herein. The program code can be resident in the memory device 604 or any suitable computer-readable medium and can be executed by the processing device 602 or any other suitable processor. In some embodiments, all modules in the database-management system 605 are stored in the memory device 604, as depicted in FIG. 6. In additional or alternative embodiments, one or more of these modules from the database-management system 605 are stored in different memory devices of different computing systems.

In some embodiments, the computing system 600 also includes a network interface device 612. The network interface device 612 includes any device or group of devices suitable for establishing a wired or wireless data connection to one or more data networks. Non-limiting examples of the network interface device 612 include an Ethernet network adapter, a modem, and/or the like. The computing system 600 is able to communicate with one or more other computing devices (e.g., a computing device that receives inputs for document-processing application 102 or displays outputs of the document-processing application 102) via a data network using the network interface device 612.

An input device 614 can include any device or group of devices suitable for receiving visual, auditory, or other suitable input that controls or affects the operations of the processing device 602. Non-limiting examples of the input device 614 include a touchscreen, stylus, a mouse, a keyboard, a microphone, a separate mobile computing device, etc. An output device 616 can include any device or group of devices suitable for providing visual, auditory, or other suitable sensory output. Non-limiting examples of the output device 616 include a touchscreen, a monitor, a separate mobile computing device, etc.

Although FIG. 6 depicts the input device 614 and the output device 616 as being local to the computing device that executes the document-processing application 102, other implementations are possible. For instance, in some embodiments, one or more of the input device 614 and the output device 616 include a remote client-computing device that communicates with the computing system 600 via the network interface device 612 using one or more data networks described herein.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method comprising:
   receiving a query to access a data item from a non-relational database, wherein the non-relational database stores a plurality of unstructured-data records across one or more storage systems;
   executing the query to traverse a root node of a hierarchy-enhanced B-tree index to a particular leaf node of a set of leaf nodes connected to the root node, wherein the particular leaf node indicates a first unstructured-data record;
   determining that the particular leaf node includes a sequential data structure, wherein the sequential data structure identifies a hierarchical relationship between the first unstructured-data record and other unstructured-data records indicated by one or more other leaf nodes, and wherein the sequential data structure includes:
      a first set of pointers that originate from the first unstructured-data record and sequentially traverse through each of the other unstructured-data records; and
      a second set of pointers, wherein each of the second set of pointers originate from a corresponding unstructured-data record of the other unstructured-data records and point directly towards the first unstructured-data record;
   using at least one of the first and second sets of pointers of the sequential data structure to access the one or more other leaf nodes without additional path traversals of the hierarchy-enhanced B-tree index, wherein using the sequential data structure without the additional path traversals of the hierarchy-enhanced B-tree index increases efficiency of database-management systems in accessing the first unstructured-data record and other unstructured-data records having the hierarchical relationship;
   retrieving the data item by parsing the other unstructured-data records; and
   generating a response to the query that includes the data item.

2. The method of claim 1, further comprising:
   receiving a request to remove a second unstructured-data record of the other unstructured-data records; and
   updating the sequential data structure to indicate a modified hierarchical relationship that excludes the second unstructured-data record.

3. The method of claim 1, further comprising:
   receiving a request to move a second unstructured-data record of the other unstructured-data records to be listed under a third unstructured-data record indicated by another leaf node;

updating the sequential data structure to indicate a modified hierarchical relationship that excludes the second unstructured-data record; and generating a second sequential data structure to indicate a second hierarchical relationship that associates the second unstructured-data record and the third unstructured-data record.

4. The method of claim 1, wherein the response additionally includes another data item associated with the first unstructured-data record.

5. The method of claim 1, wherein the data item is accessed from a second unstructured-data record of the other unstructured-data records, and wherein the response additionally includes a data path between the first unstructured-data record and the second unstructured-data record.

6. The method of claim 1, wherein the response additionally includes a list of the other unstructured-data records.

7. A system comprising:

one or more processors; and a non-transitory computer-readable medium storing instructions that when executed by the one or more processors, cause the one or more processors to perform operations including:

receiving a query to access a data item from a non-relational database, wherein the non-relational database stores a plurality of unstructured-data records across one or more storage systems;

executing the query to traverse a root node of a hierarchy-enhanced B-tree index to a particular leaf node of a set of leaf nodes connected to the root node, wherein the particular leaf node indicates a first unstructured-data record;

determining that the particular leaf node includes a sequential data structure, wherein the sequential data structure identifies a hierarchical relationship between the first unstructured-data record and other unstructured-data records indicated by one or more other leaf nodes, and wherein the sequential data structure includes:

a first set of pointers that originate from the first unstructured-data record and sequentially traverse through each of the other unstructured-data records; and a second set of pointers, wherein each of the second set of pointers originate from a corresponding unstructured-data record of the other unstructured-data records and point directly towards the first unstructured-data record;

using at least one of the first and second sets of pointers of the sequential data structure to access the one or more other leaf nodes without additional path traversals of the hierarchy-enhanced B-tree index, wherein using the sequential data structure without the additional path traversals of the hierarchy-enhanced B-tree index increases efficiency of database-management systems in accessing the first unstructured-data record and other unstructured-data records having the hierarchical relationship;

retrieving the data item by parsing the other unstructured-data records; and generating a response to the query that includes the data item.

8. The system of claim 6, wherein the first unstructured-data record is associated with an initial version, wherein the instructions further cause the one or more processors to perform operations comprising:

receiving a request to create an updated version of the first unstructured-data record;

generating a new leaf node that indicates the updated version of the first unstructured-data record;

connecting the new leaf node to the root node; and updating the sequential data structure to incorporate the new leaf node.

9. The system of claim 6, wherein the instructions further cause the one or more processors to perform operations comprising:

receiving a request to remove a second unstructured-data record of the other unstructured-data records; and updating the sequential data structure to indicate a modified hierarchical relationship that excludes the second unstructured-data record.

10. The system of claim 6, wherein the instructions further cause the one or more processors to perform operations comprising:

receiving a request to move a second unstructured-data record of the other unstructured-data records to be listed under a third unstructured-data record indicated by another leaf node;

updating the sequential data structure to indicate a modified hierarchical relationship that excludes the second unstructured-data record; and generating a second sequential data structure to indicate a second hierarchical relationship that associates the second unstructured-data record and the third unstructured-data record.

11. The system of claim 6, wherein the response additionally includes another data item associated with the first unstructured-data record.

12. The system of claim 6, wherein the data item is accessed from a second unstructured-data record of the other unstructured-data records, and wherein the response additionally includes a data path between the first unstructured-data record and the second unstructured-data record.

13. The system of claim 6, wherein the response additionally includes a list of the other unstructured-data records.

14. A non-transitory computer-readable medium storing instructions that when executed by one or more processors, cause the one or more processors to perform operations including:

receiving a query to access a data item from a non-relational database, wherein the non-relational database stores a plurality of unstructured-data records across one or more storage systems;

executing the query to traverse a root node of a hierarchy-enhanced B-tree index to a particular leaf node of a set of leaf nodes connected to the root node, wherein the particular leaf node indicates a first unstructured-data record;

determining that the particular leaf node includes a sequential data structure, wherein the sequential data structure identifies a hierarchical relationship between the first unstructured-data record and other unstructured-data records indicated by one or more other leaf nodes, and wherein the sequential data structure includes:

a first set of pointers that originate from the first unstructured-data record and point towards each of the other unstructured-data records; and a second set of pointers, wherein each of the second set of pointers originate from a corresponding unstructured-data record of the other unstructured-data records and point directly towards the first unstructured-data record;

US 12,675,509 B2

19 using at least one of the second set of pointers of the sequential data structure to access the one or more other leaf nodes without additional path traversals of the hierarchy-enhanced B-tree index, wherein using the sequential data structure without the additional path traversals of the hierarchy-enhanced B-tree index increases efficiency of database-management systems in accessing the first unstructured-data record and other unstructured-data records having the hierarchical relationship; retrieving the data item by parsing the other unstructured-data records; and generating a response to the query that includes the data item.

15. The non-transitory computer-readable medium of claim 13, wherein the first unstructured-data record is associated with an initial version, wherein the instructions further cause the one or more processors to perform operations comprising:

receiving a request to create an updated version of the first unstructured-data record;

generating a new leaf node that indicates the updated version of the first unstructured-data record;

connecting the new leaf node to the root node; and updating the sequential data structure to incorporate the new leaf node.

16. The non-transitory computer-readable medium of claim 13, wherein the instructions further cause the one or more processors to perform operations comprising:

receiving a request to remove a second unstructured-data record of the other unstructured-data records; and updating the sequential data structure to indicate a modified hierarchical relationship that excludes the second unstructured-data record.

20

17. The non-transitory computer-readable medium of claim 13, wherein the instructions further cause the one or more processors to perform operations comprising:

receiving a request to move a second unstructured-data record of the other unstructured-data records to be listed under a third unstructured-data record indicated by another leaf node;

updating the sequential data structure to indicate a modified hierarchical relationship that excludes the second unstructured-data record; and generating a second sequential data structure to indicate a second hierarchical relationship that associates the second unstructured-data record and the third unstructured-data record.

18. The non-transitory computer-readable medium of claim 13, wherein the response additionally includes another data item associated with the first unstructured-data record.

19. The non-transitory computer-readable medium of claim 13, wherein the data item is accessed from a second unstructured-data record of the other unstructured-data records, and wherein the response additionally includes a data path between the first unstructured-data record and the second unstructured-data record.

20. The method of claim 1, wherein the first unstructured-data record is associated with an initial version, the method further comprising:

receiving a request to create an updated version of the first unstructured-data record;

generating a new leaf node that indicates the updated version of the first unstructured-data record;

connecting the new leaf node to the root node; and updating the sequential data structure to incorporate the new leaf node.

*   *   *   *   *